(No Model.) 6 Sheets—Sheet 2.

N. E. NASH.
MECHANICAL BOILER FEEDER.

No. 532,007. Patented Jan. 1, 1895.

- WITNESSES -
Dan'l Fisher
Geo. Hemsley

- INVENTOR -
Nathan E. Nash.
by G.H. W.S. Heard
Att'y.

(No Model.) 6 Sheets—Sheet 3.
N. E. NASH.
MECHANICAL BOILER FEEDER.

No. 532,007. Patented Jan. 1, 1895.

- WITNESSES -

- INVENTOR -

(No Model.) 6 Sheets—Sheet 4.
N. E. NASH.
MECHANICAL BOILER FEEDER.

No. 532,007. Patented Jan. 1, 1895.

WITNESSES  
Dan'l Fisher  
George Hemsley

INVENTOR  
Nathan E. Nash, (No Model.) 6 Sheets—Sheet 5.
N. E. NASH.
MECHANICAL BOILER FEEDER.

No. 532,007. Patented Jan. 1, 1895.

WITNESSES
Dan'l Fisher
George Hemsley

INVENTOR
Nathan E. Nash
by Geo. W. T. Knapp
Atty.

(No Model.) 6 Sheets—Sheet 6.
N. E. NASH.
MECHANICAL BOILER FEEDER.
No. 532,007. Patented Jan. 1, 1895.
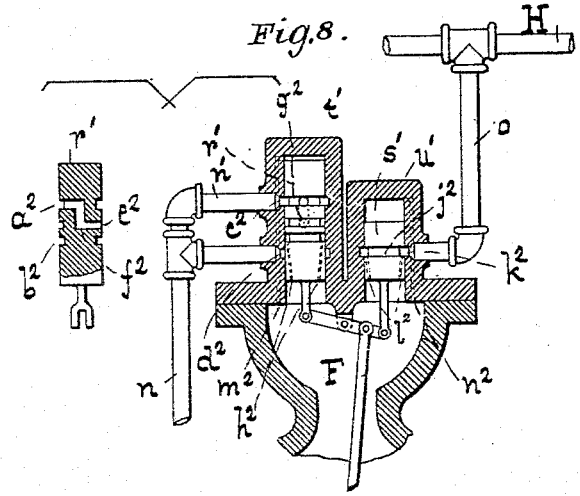
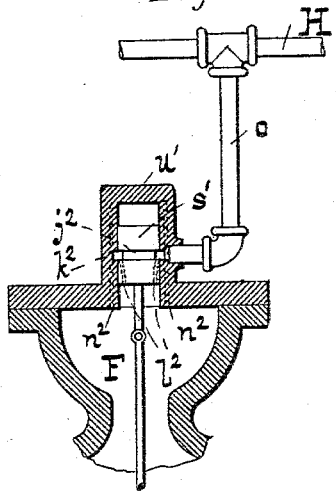
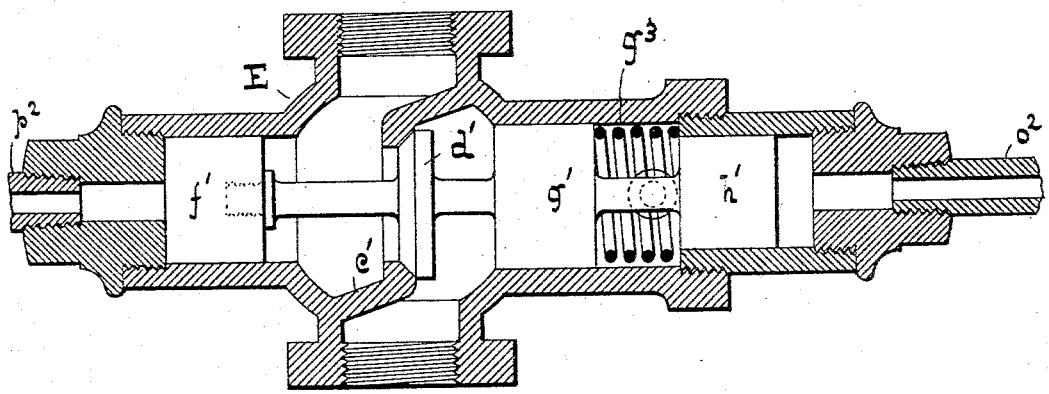
-WITNESSES-
Dan'l Fisher
George Hemsley
-INVENTOR-
Nathan E. Nash

UNITED STATES PATENT OFFICE.

NATHAN E. NASH, OF WESTERLY, RHODE ISLAND, ASSIGNOR, BY DIRECT AND MESNE ASSIGNMENTS, TO THE AUTOMATIC TANK AND BOILER FEED COMPANY, OF OHIO.

MECHANICAL BOILER-FEEDER.

SPECIFICATION forming part of Letters Patent No. 532,007, dated January 1, 1895.

Application filed April 25, 1894. Serial No. 509,015. (No model.)

*To all whom it may concern:*

Be it known that I, NATHAN E. NASH, of Westerly, in the county of Washington and State of Rhode Island, have invented certain Improvements in Mechanical Boiler-Feeders, of which the following is a specification.

In the description of the said invention which follows, reference is made to the accompanying drawings forming a part hereof, and in which—

Figure 1:
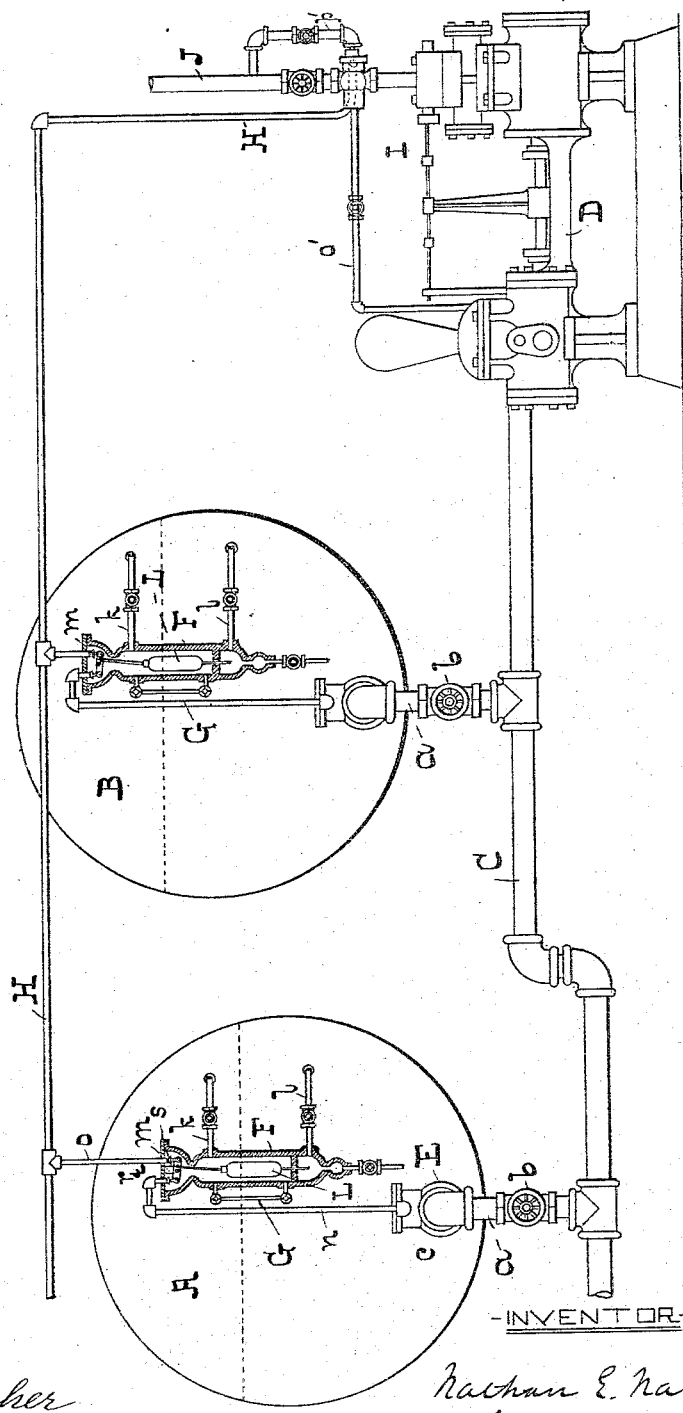
Figure 2:
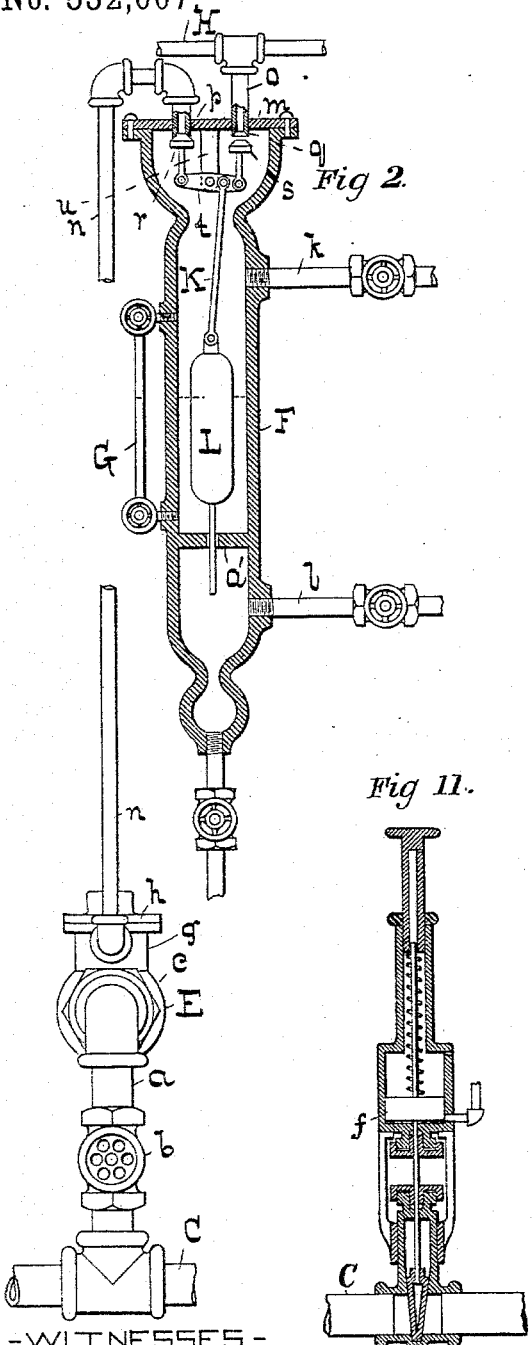
Figure 3:
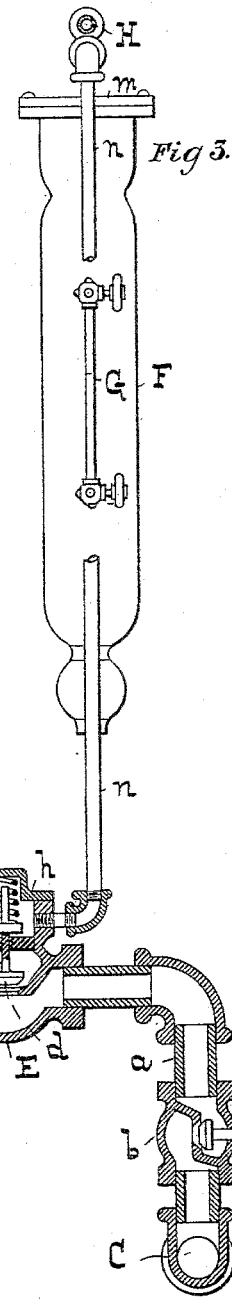

Figure 1 is a front view of two boilers to which my improved boiler feeder is applied, together with a feeding steam pump, and its attachments. Figs. 2 and 3 are enlarged details of the apparatus, and Figs. 4 and 5 still further enlarged views of a part of the apparatus, as will hereinafter fully appear. Figs. 6 to 11 inclusive, illustrate modifications hereinafter described.

Referring now to Figs. 1 to 5, inclusive, of the drawings, A and B are boilers of the cylindrical type, on different horizontal planes, the boiler A being lower than the one B.

My object in illustrating boilers on different planes is to show that it is not necessary for the successful operation of the apparatus that all the boilers fed should have their water line on the same plane, and that the water level in each boiler is maintained at a prearranged height independently of the others.

C is the main feed water pipe leading, in the present case, from the steam feed pump D to the boilers, any number of which may be used. The branches which extend from the main feed pipe C, directly to the boilers, are denoted by $a$, and they are each provided with a stop valve $b$.

In each of the branch feed pipes is a controlling valve E which consists of an ordinary globe valve shell $c$ having a common puppet valve $d$. The stem $e$ of the puppet valve $d$ has a piston $f$ adapted to move with the stem, in a cylinder $g$, formed, preferably, as a part of the shell $c$. The cylinder $g$ has a close cover $h$, and the stem $e$ at a point above the piston, has a collar $i$; and between these is situated a coiled spring $j$. This spring effects a slight tension on the valve $d$ in the direction to close it. The degree of tension is regulated by means of the collar $i$ which is susceptible of adjustment on the stem.

F is a vessel supported in any suitable manner by the boiler, or by any other stationary object, connected near its upper end to the steam space of the boiler by means of a pipe $k$, and to the water space of the boiler by a pipe $l$. By means of these pipes, the vessel F contains steam and water, and the height of the latter corresponds with that of the water in the boiler. An ordinary glass water gage G shows the water level. Figs. 2 and 3 are enlarged views of the vessel F and its connections, partly in section.

The vessel F has a head $m$ and to this head is screwed a pipe $n$ leading to the cylinder $g$ forming a part of the controlling valve E. By this pipe steam is brought into contact with the upper face of the piston $f$. A second pipe $o$ screwed into the head $m$ connects with a pipe H leading to a governor valve I in the steam pipe of the steam pump D, and hereinafter more particularly described.

At the inner ends of the pipes $n$ and $o$, and situated within the vessel F, are valve seats $p$ and $q$ for valves $r$ and $s$, the stems of which are jointed to a lever $t$ centrally pivoted to a stand $u$ projecting downward from the head $m$ of the vessel F. At one side of the pivotal point of the lever $t$, is connected a rod K, the other end of which is secured to a float L having a guide stem at its lower end which passes through a guide $a'$.

From this description it will be seen that when the float L rises, the valve $s$ closes the pipe $o$, and the valve $r$ is withdrawn from its seat, and the pipe $n$ thereby opened; and that in the descent of the float the positions of the valves are reversed, the pipe $o$ being closed and the one $n$ opened.

Figure 4:
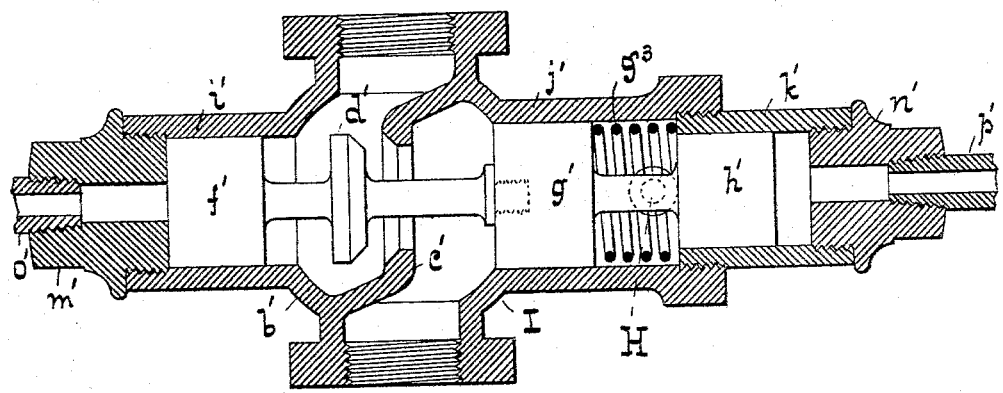
Figure 5:
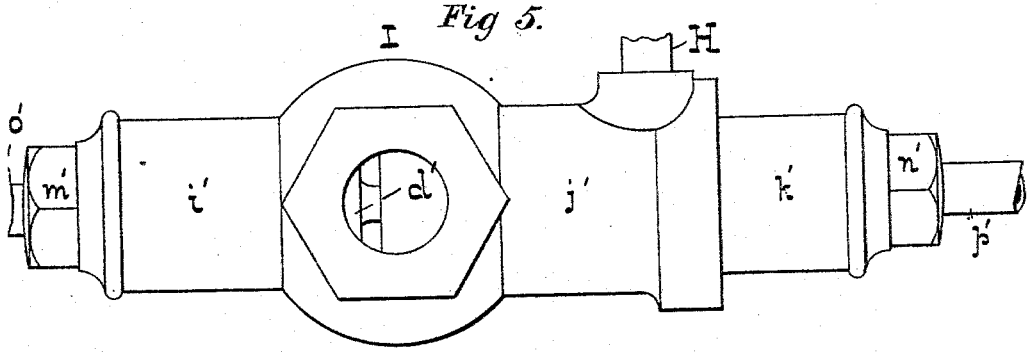

Referring now particularly to Figs. 4 and 5 of the drawings, which are respectively, a longitudinal section, and an exterior top view of the governor valve I before alluded to, it will be seen that it consists of a shell $b'$ having a bridge $c'$ with a seat adapted to receive a puppet valve $d'$. The stem of the valve $d'$ has three pistons, $f'$, $g'$ and $h'$ of different diameters. The piston $g'$ is the largest, the one $f'$ slightly smaller, and the one $h'$ the smallest. Each piston moves in a cylinder, and these are denoted by $i'$, $j'$ and $k'$. The cylinders $i'$ and $j'$ are preferably made integral with the shell $b'$, and the one $k'$ is screwed or otherwise fastened to the end of the cylinder $j'$.

The cylinders $i'$ and $k'$ have heads $m'$ and $n'$ and into the one $m'$ is screwed a pipe $o'$ which leads to the water chamber of the steam pump D. The head $n'$ has a pipe $p'$ extending to the steam pipe J of the steam pump D. The pipe H before referred to is tapped into the cylinder $j'$ at a point between the pistons $g'$ and $h'$. Between the pistons $g'$ and $h'$ is a spiral spring $g^3$. This spring bears endwise against the face of the piston $g'$ and the end of the cylinder $k'$ and its office is to give a constant pressure on the piston $g'$ to operate the valve $d'$.

Referring again to Figs. 1 and 2 it will be seen that the lower end of the vessel F has a settling chamber A' to receive sediment from the water, and a pipe B' whereby the sediment may be blown off.

Supposing the steam pump D to be in operation and feeding the boilers, the water lines in all of which are slightly lower than those pre-arranged, the operation of the apparatus is as follows:—Water from the pump D is forced through the main feed pipe C and passes through the branches $a$ and the controlling valves E to the boilers. When the prearranged water level has been reached, the float L in each vessel rises and the valve $r$ is withdrawn from its seat $p$, which opens the pipe $n$. Steam is thus admitted to the top of the piston $f$ in the controlling valve E, and the valve $d$ forced to its seat. All flow of water to the boilers is then stopped. At the same time the valve $s$ is seated and the passage of steam to the pipe $o$ and thence to the pipe H stopped. This stoppage of steam effects a reduction of pressure in the cylinder $j'$ of the governor valve I, and at a point between the pistons $g'$ and $h'$. The water pressure on the piston $f'$ is equal to the pressure of steam acting on the piston $h'$, but the area of the piston $f'$ being greater than that of the one $h'$ the valve $d'$ is seated, the resistance of the steam acting between the pistons $g'$ and $h'$ being removed. The closing of the valve $d'$ stops the operation of the pump D but should there be any leakage of water through valves or pipes, the water pressure on the piston $f'$ is reduced and in view of the constant tension of the spring $g^3$ the valve $d'$ is slightly opened which sets in motion the pump D and its movement is continued until the original pressure is re-established. Of course it will be understood that to effect this result the leakage must be such that the force of the large piston $f'$ to keep the valve $d'$ closed is overcome by the force of the smaller piston $h'$, together with the constant pressure of the spring $g^3$. In other words, the piston $h'$ although of smaller area, when acted on by a higher pressure, and assisted by the spring $g^3$ exerts more force than the larger piston $f'$ when subjected to a lower pressure, and the valve $d'$ is therefore opened. When the original pressure on the piston $f'$ is established by the operation of the pump, the valve $d'$ is again closed.

As all the pipes $o$ serve to feed the pipe H with steam, it is obvious that the operation of the feed pump D is never stopped until all the said feeding pipes are closed.

If the prearranged water level is lowered in any one of the boilers, the float of that particular boiler alone is affected, and in descending closes the valve $r$ and steam is shut off from the pipe $n$, and the pressure on the piston $f'$ being thereby reduced, and the valve $d'$ is opened by the pressure in the water pipe C. At the same time the valve $s$ is drawn from its seat and the pipe $o$ opened, and steam is thereby admitted to the pipe H and thence to the cylinder $j'$ of the governor valve I, and this steam pressure acting upon the piston $g'$ in addition to the tension of the spring $g^3$ is sufficient to overcome the pressure of water on the piston $f'$, and the valve $d'$ is forced from its seat. The valve $d'$ being opened, steam is admitted to the pump D which is set in motion, and the said boiler fed.

It is evident that not only one, but any number of the whole battery of boilers will be automatically fed as described, independently of the others, without regard to their position or height.

Figure 6:
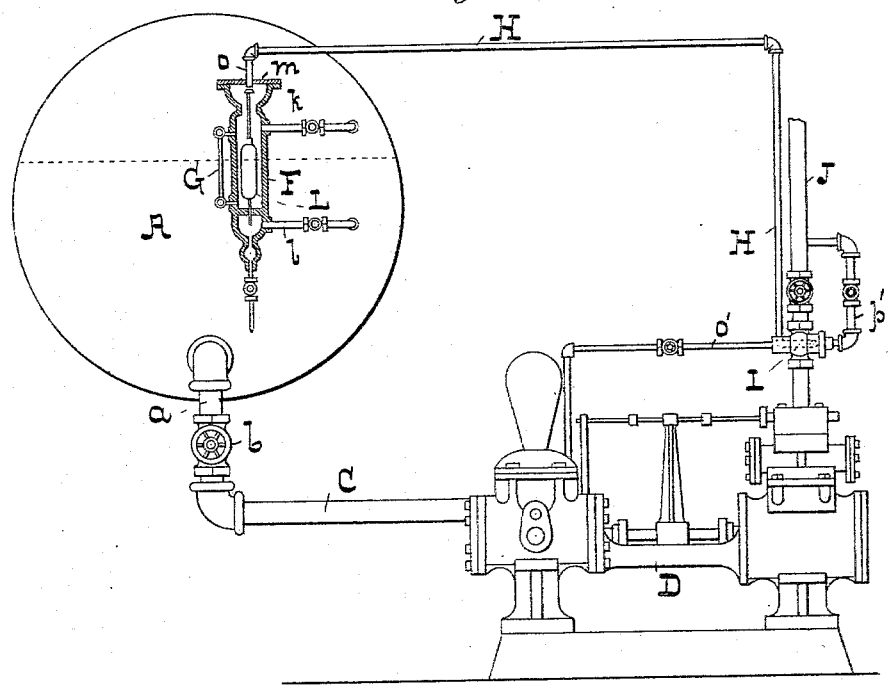

Referring now to Fig. 6 which shows the application of the invention to a single boiler, it will be seen that I have dispensed with the controlling valve E, the pipe $n$, the valve $r'$, the lever $t$ and the stand $u$, and have attached the rod K directly to the valve $s$. In other respects the construction before described is preserved.

In the rise of water in the vessel F, the float L directly affects the closing of the valve $s$ and steam is shut off from the pipes $o$ and H. This causes the closing of the governor valve I in the manner hereinbefore described.

Figure 11:
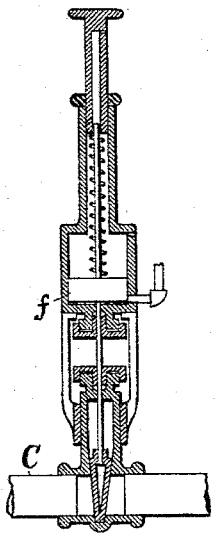

In Fig. 11 the valve E is shown as of the gate type and the steam pressure on the piston $f$ effects its opening instead of closing as in the valve before described.

Figure 7:
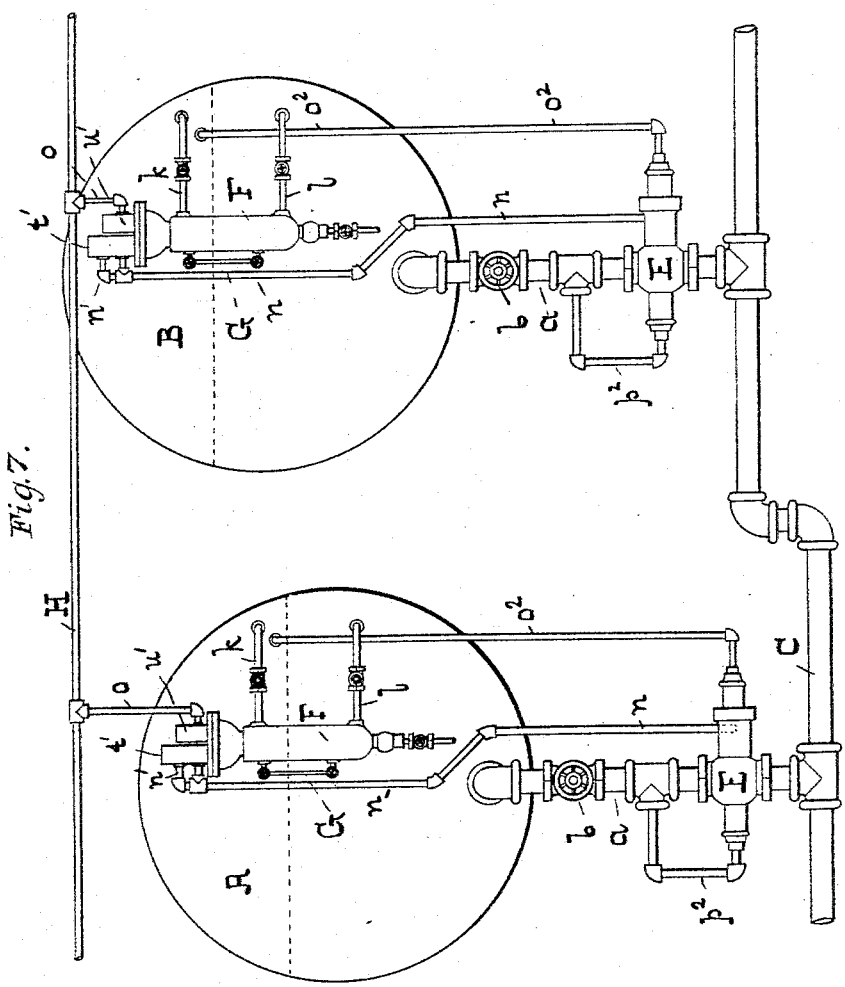

Figs. 7, 8 and 9 illustrate elaboration in details of the invention, whereby greater efficiency in the operation of the same is effected. The valves $r$ and $s$ shown particularly in Fig. 2 are of the simplest form and character, and if perfectly constructed will perform the operations desired, but such perfection cannot be obtained in practice. Leakage, to which these valves are liable would, to some extent render the apparatus inoperative, and I shall now therefore describe valves in which the ordinary imperfections found in all mechanical appliances will not interfere with their operation. Further, in the construction shown in Fig. 2, an appreciable length of time has to elapse before condensation in the pipe $n$ and the space above the piston $f$ in Fig. 3 will take place, and as I have in view the maintenance of a practically uniform water line, it is evident that the valves $r$ and $s$ will be almost constantly in motion, that is to say, opening and closing, and the valve $r$ may not be closed for a sufficient length of time to allow of condensation of steam in the pipe $n$ and the space above the piston $f$, which is necessary before the said piston can be forced opened and the valve $d$ lifted from its seat. To obviate this difficulty I substitute for the valves $r$ and $s$ and their seats, the piston valves $r'$ and $s'$ and place them in cylinders $t'$ and $u'$.

The valve $r'$ consists of a piston having two annular grooves $a^2$ and $b^2$ adapted in its upward and downward motions, to register alternately with similar grooves $c^2$ and $d^2$ in the cylinder $t'$. From the groove $d^2$ extends the pipe $n$ and a branch of this pipe connects with the groove $c^2$. The piston valve $r'$ has a third annular groove $e^2$ and this groove is connected to the one $a^2$ by a cross channel $f^2$, and the groove $e^2$, (when the piston valve is in its highest position,) registers with a hole $g^2$ in the wall of the cylinder $t$, which may be connected with a waste pipe, not shown. When the float L is down, the groove $a^2$ of the piston valve $r'$ is in communication with the one $c^2$ of the cylinder, while the groove $d^2$ is covered by the valve. Steam from the pipe $n$ is then exhausted, the piston $f$ relieved from pressure, and the valve $d$ allowed to open; but when the float L rises, the piston $r'$ is lowered, the branch pipe $n'$ closed, and the main pipe $n$ opened to the interior of the vessel F by means of the small apertures $h^2$ and the annular grooves $d^2$ and $b^2$.

From the above description it will be seen that the pipe $n$ is instantly relieved from pressure as soon as the float falls, and water admitted to the boiler.

The piston valve $s'$ is similar to the one $r'$ except that it has only one annular groove $j^2$, and this arranged to register with another groove $k^2$ in the cylinder $u'$ as the float is lowered.

The steam pipe $o$ is connected with the groove $k^2$. The piston valve $s'$ has apertures $l^2$ which correspond with the ones $h^2$ in the valve $r'$.

To prevent compression of steam and water in the cylinders $t'$ and $u'$ they have passages $m^2$ and $n^2$ leading to the vessel F.

Fig. 9 shows the substitution of the above described piston valve for the conical valve illustrated in Fig. 6.

In Figs. 7 and 10 I show the valve E of the preferred construction. It differs from the one I shown particularly in Fig. 4 in that its valve $d'$ is on the reverse side of the bridge $c'$ and therefore closes instead of opening when pressure is applied between the pistons $g'$ and $h'$. The pipe $o^2$ corresponds with the pipe $p'$ of the old valve and is connected to the boiler, see Fig. 7, and the pipe $p^2$ corresponds with the pipe $o'$ of the old valve, and leads to the branch pipe $a$ of the water pipe C. In the new valve E the outer faces of the pistons $f'$ and $h'$ are subjected to the boiler pressure, and the inner faces of the pistons $g'$ and $h'$ are either exposed to the boiler pressure or entirely relieved from any pressure, according to the position of the valve $r$ or its substitute $r'$. When the valve $r'$ is open, the valve $d'$ is closed and when it is closed the valve $d'$ is opened by the pressure of the feed water, and the boiler thereby fed.

I have shown and described three constructions of the valve E and I could illustrate a number of modifications, but I do not limit my invention to any peculiar construction, provided its character is such as to effect the result described.

I claim as my invention—

1. A governor valve adapted for application to a steam pipe of a steam pump, or to the feed pipe direct when no pump is employed, which consists essentially of a shell with a bridge having a valve opening and seat, a valve with a stem carrying three pistons of unequal diameters, cylinders for the said pistons, pipes to admit water to the outer face of one of the outer pistons and steam to the corresponding face of the other and another pipe to convey steam to the space between the adjacent pistons, substantially as specified.

2. In combination with a steam boiler, a steam feed pump and a feed water pipe which connects the pump and boiler, a governor or valve in the steam supply pipe of the said pump which consists of a shell, a puppet valve with a stem extending from both sides thereof, having on one stem a piston of a certain diameter and on the other two pistons the one next to the valve being larger than the first, and the second smaller than the first, cylinders for the said pistons, a pipe leading from the cylinder of the first piston to the feed water under pressure, a second pipe leading from the cylinder of the smallest piston to the steam supplying the pump, and a third pipe leading from the space between the two adjacent pistons to the steam space of the boiler, a valve to control this steam pipe and a float supported by water in communication with that in the boiler, to control the said valve, substantially as specified.

NATHAN E. NASH.

Witnesses:
WM. T. HOWARD,
DANL. FISHER.